(No Model.) 2 Sheets—Sheet 1.
L. P. ROGERS & J. HOFMAN.
TRANSPORTING RECEPTACLE.
No. 450,320. Patented Apr. 14, 1891.
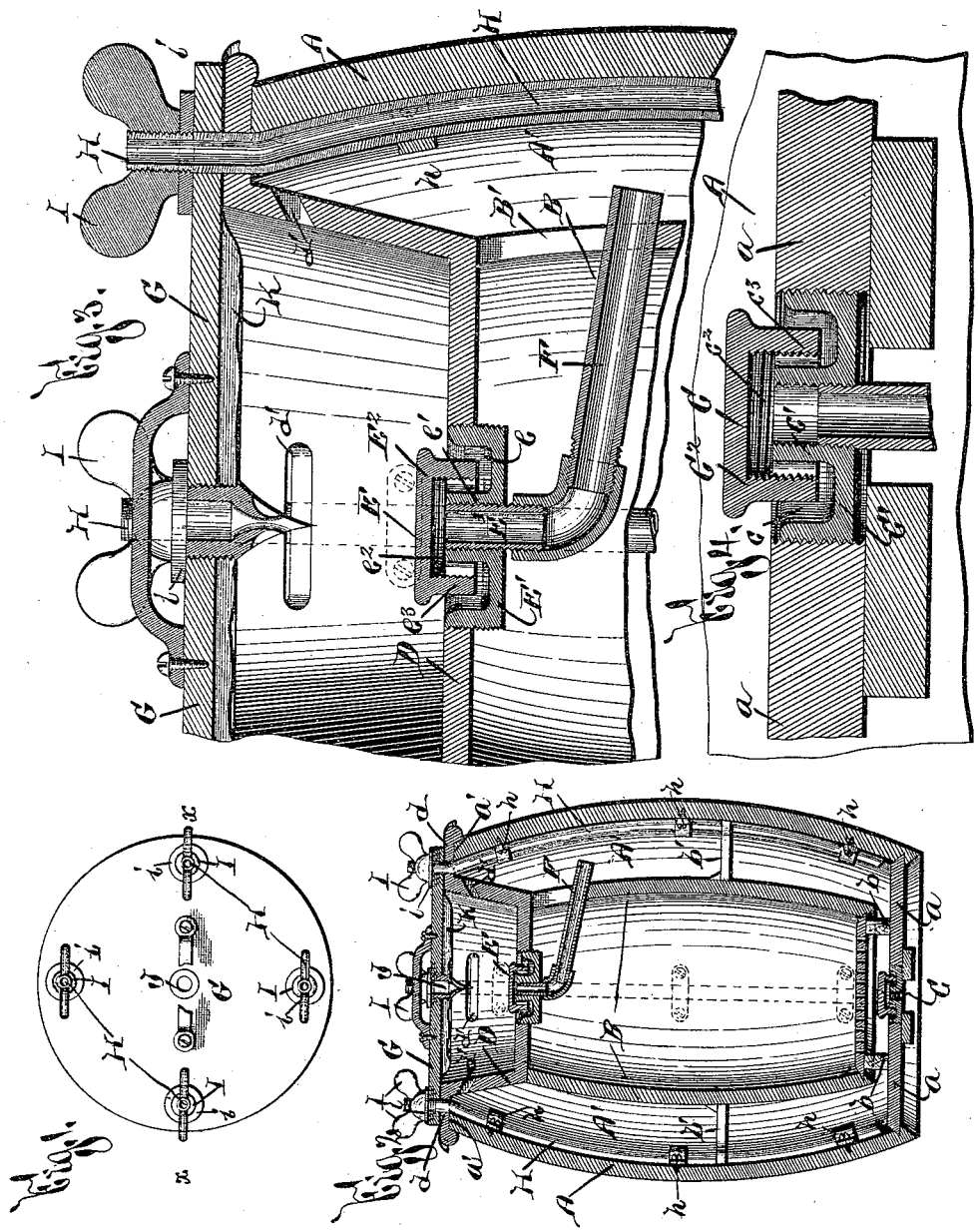
Witnesses
W. H. Randall
H. E. Chase
Inventors
Louis P. Rogers
John Hofman
By their Attorneys
Hey Wilkinson & Parsons (No Model.) 2 Sheets—Sheet 2.
L. P. ROGERS & J. HOFMAN.
TRANSPORTING RECEPTACLE.
No. 450,320. Patented Apr. 14, 1891.
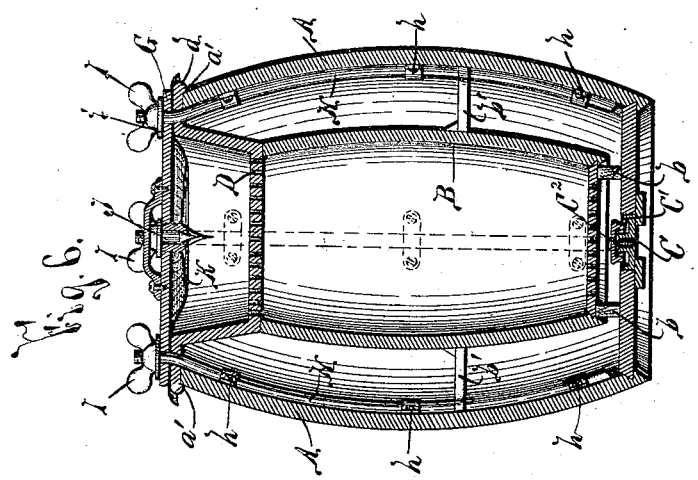
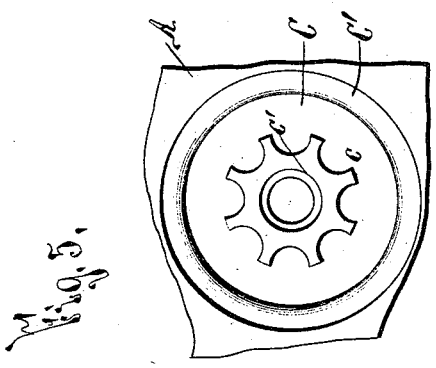
Witnesses
W. H. Randall,
H. E. Chase,
Inventors
Louis P. Rogers
John Hofman
By their Attorneys
H. G. Wilkinson & Parsons

UNITED STATES PATENT OFFICE.

LOUIS P. ROGERS AND JOHN HOFMAN, OF ROCHESTER, NEW YORK.

TRANSPORTING-RECEPTACLE.

SPECIFICATION forming part of Letters Patent No. 450,320, dated April 14, 1891.

Application filed August 30, 1890. Serial No. 363,543. (No model.)

*To all whom it may concern:*

Be it known that we, LOUIS P. ROGERS and JOHN HOFMAN, of Rochester, in the county of Monroe, in the State of New York, have invented new and useful Improvements in Transporting-Receptacles, of which the following, taken in connection with the accompanying drawings, is a full, clear, and exact description.

Our invention relates to an improved receptacle for transporting perishable articles of the class set forth in our pending application, Serial No. 323,647, and has for its object the production of a simple and effective device into which the said articles can be readily packed or loaded and by which they are preserved in a fresh condition.

To this end our invention consists, essentially, in a suitable outer shell, an inner shell supported within the outer shell, with a space between the two, an ice-support above the inner shell at one extremity of the outer shell, a removable cover for the outer shell, and openings in the wall of said shell for admitting and withdrawing the air.

The invention also consists in a trap at the base of the ice-support for withdrawing the ice-water, a pipe for discharging the water to the outside of the inner receptacle, and a trap at the base of the outer receptacle for withdrawing the water from the outer shell.

In describing this invention reference is had to the accompanying drawings, forming a part of this specification, in which like letters indicate corresponding parts in all the views.

Figure 1 represents a top plan view of our improved invention; Fig. 2, a horizontal vertical section taken on line $x$ $x$, Fig. 1; Fig. 3, an enlarged detail illustrating the upper portion of the inner shell, the outer shell, the ice-support, the removable cover, the air inlet and outlet, and the trap in the base of the ice-support. Fig. 4 is an enlarged detail view of the lower trap in the base of the outer shell. Fig. 5 is a detail view showing in plan the lower trap with its cap removed, and Fig. 6 is a modified form of our invention.

A represents the inclosing or outer frame or shell of our receptacle, which is preferably of barrel form, as illustrated, although, if desired, any other suitable and desirable form and construction could be used. Supported within the outer shell is the inner shell B, also preferably of barrel shape and of a suitable size, whereby the same can be readily placed in or removed from operative position. The shell B rests upon suitable supports $b$ upon the base $a$ of the outer shell A in order that the drip-water may flow beneath the same to a trap C, presently described.

Interposed between the inner wall of the outer shell and the outer wall of the inner shell are the side supports $b'$, which prevent rocking and jarring of the inner shell.

Mounted above the inner shell is an ice support or tray D, of suitable form, size, and construction, and here illustrated as provided at its base with a trap E for receiving the ice-water and as connected to a pipe F for passing said water to the outside of the inner shell and into the space interposed between the same.

Formed upon the support D is the shoulder $d$, which rests upon a shoulder $a'$ of the outer shell for supporting said ice-support. As illustrated, this shoulder $a'$ consists of the top of the barrel, although a shoulder on its inner periphery could be used in lieu thereof.

G represents the cover of our improved receptacle, which in the illustrated construction serves as a means for retaining the ice-support in position, since the shoulder $d$ thereof is interposed between the cover and the top edge of the barrel.

In order to secure the cover in operative position, we provide the supports H, which extend upwardly beyond its top edge and are provided at their upper extremity with the clamping-nuts or thumb-screws I, resting upon a washer $i$, imposed upon the cover. These supports are preferably used as outlet or vent passages for withdrawing the air from the lower extremity of the outer shell, and consist of pipes secured to its inner wall by straps or other supports $h$. The air-inlet J consists, preferably, of a nipple extending through the wall of the cover and discharging over the ice-support.

Mounted above the ice-support, and preferably interposed between the cover G and the shoulder $d$ of the ice-support, is a shield K for preventing the entrance of air, dust, &c., and, as best shown in Fig. 3, the lower extremity of the nipple J, which is pointed, pierces the shield K for discharging the air on the inner side thereof.

Formed in the wall of the ice-support are suitable apertures $d'$, through which the air passes into the space $A'$, interposed between the inner and outer shells, from the lower extremity of which it is withdrawn through the pipes H.

The trap E consists of the lower plate $E'$, provided with an annular recess $e$ and an inner grooved flange $e'$, and an upper plate $E^2$, having an inner recess $e^2$ for receiving the upturned flange $e'$ and a depending outer flange $e^3$, having screw-threads provided at the periphery of the grooved flange $e'$. A slight space intervenes between the adjacent edges of the depending flange $e^3$ of the plate $E'$ and the upper face of the recess $e^2$ of the plate E, into which the water feeds as it passes upwardly through the grooves of the flange $e'$ and thence downwardly through the outlet-passage $E^3$ in the plate E.

Connected to the passage or pipe $E^3$ is a pipe F, which extends through a slot $B'$ in the wall of the inner shell and discharges the water to the outside thereof. It will thus be understood that without the slightest liability of damage I can transport perishable articles by my improved apparatus, which would become injured by contact with water, since the same is conducted to the outside of said inner shell and cannot contact with the transported articles.

The trap C is of the same construction as the one E, and is composed of the lower plate $C'$, having the recess $c$ and upturned annular grooved shoulder $c'$, and the upper plate $C^2$, having the inner recess $c^2$ and the depending flange $c^3$, all of which preferably operate in the manner previously described in connection with the trap E.

At Fig. 6 we have shown a modified form of our invention, which is applicable for transporting articles not liable to become injured by contact with water, and hence we have dispensed with the upper trap E and the pipe F, thus allowing the water to circulate downward through the inner shell. In this case we also prefer to dispense with the opening $d'$ in the wall of the ice-support and pass the cold air directly through the inner shell instead of around the same, as previously described.

The operation of our invention will be readily perceived from the foregoing, and it will be understood that the component parts are simple in construction and readily manufactured, and that when assembled the whole produces an operative device which is effective, strong, and durable and fills a long-felt want for a strong and efficient receptacle in which perishable articles can be cheaply and readily transported with a minimum cost of expense by means of a cool circulating current. Moreover, it will be understood that this device is particularly applicable when transporting material stored in barrels, since the entire barrel may be placed within the outer receptacle without necessitating repacking or handling of the contained articles, which is a feature of great advantage. It will be understood that we do not herein claim the construction shown in our aforesaid application.

It will be understood that we do not herein claim the specific form of trap used to permit egress of water from the receptacle, since the same forms the subject-matter of our pending application, Serial No. 381,593, filed February 16, 1891.

Having thus fully described our invention, what we claim as new, and desire to secure by Letters Patent, is—

1. In a transporting-receptacle, the combination of an outer shell, an inner shell removably mounted within the outer shell, with a space between the two, an ice-chamber removably mounted above the inner shell, and openings in the wall of said outer shell for admitting and withdrawing the air, substantially as and for the purpose set forth.

2. In a transporting-receptacle, the combination of an outer shell, an inner shell removably mounted within the outer shell, with a space between the two, an ice-chamber removably mounted above the inner shell, supports extending above the outer shell, a cover movable on said supports, clamps for securing said cover in position, and openings through the wall of said outer shell for admitting and withdrawing the air, substantially as and for the purpose described.

3. In a transporting-receptacle, the combination of an outer shell, an inner shell removably mounted within the outer shell, with a space between the two, an ice-chamber removably mounted above said inner shell, a removable cover secured to the top of the outer shell, a shield between said cover and ice-support, an inlet-passage opening from the outside of said shell through said shield, and an outlet-opening in the wall of said outer shell for withdrawing the air from said shell, substantially as and for the purpose specified.

4. In a transporting-receptacle, the combination of an outer shell, an inner shell removably mounted within the outer shell, with a space between the two, an ice-chamber removably mounted above said inner shell, an air-inlet having its inlet above said ice-support for passing a current of air to the same, and openings in the side wall of said ice-chamber leading to the space between the outer and inner shells, substantially as and for the purpose described.

5. In a transporting-receptacle, the combination of an outer shell, an inner shell within the outer shell, with a space between the two, an ice-support above said inner shell, a trap in said ice-support for the drip-water, a pipe leading from said drip to the outside of the inner shell, and openings in the wall of said outer shell for admitting and withdrawing a current of air, substantially as and for the purpose specified.

5. In testimony whereof we have hereunto signed our names, in the presence of two attesting witnesses, at Rochester, in the county of Monroe, in the State of New York, this 10th day of June, 1890.

LOUIS P. ROGERS.
JOHN HOFMAN.

Witnesses:
E. A. WEISBURG,
M. BAXTER.